(12) United States Patent
Kartalopoulos

(10) Patent No.: US 6,617,566 B2
(45) Date of Patent: Sep. 9, 2003

(54) APPARATUS AND METHOD FOR OPTICAL PATTERN DETECTION

(75) Inventor: Stamatios V. Kartalopoulos, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/848,134

(22) Filed: May 3, 2001

(65) Prior Publication Data

US 2002/0038847 A1 Apr. 4, 2002

Related U.S. Application Data

(60) Provisional application No. 60/237,880, filed on Oct. 4, 2000.

(51) Int. Cl.$^7$ ................................................ H01J 40/14
(52) U.S. Cl. ............................. 250/214 R; 250/214 DC
(58) Field of Search ...................... 250/214 R, 214.1, 250/231.13, 231.16, 221, 559.44, 201.5, 214 DC; 369/44.34, 44.26

(56) References Cited

U.S. PATENT DOCUMENTS

| | | | | |
|---|---|---|---|---|
| 3,621,139 A | * | 11/1971 | Gibson | ...................... 178/69 B |
| 3,918,054 A | * | 11/1975 | Collins | ........................ 342/192 |
| 5,276,666 A | * | 1/1994 | Gunther et al. | .......... 369/59.22 |

* cited by examiner

*Primary Examiner*—Que T. Le

(57) ABSTRACT

An optical pattern detector in accordance with the principles of the present invention includes an optical sensor configured to sense a plurality of optical signals, an optical summer configured to receive and sum the sensed optical signals, and a sampler configured to sample the summed optical signals. The pattern detector may be configured to receive serial or parallel binary optical signals and, with various weightings of the sensed optical signals, may operate as an optical digital to analog converter, automatically decoding binary digital optical signals.

25 Claims, 4 Drawing Sheets

APPARATUS AND METHOD FOR OPTICAL PATTERN DETECTION

CROSS-REFERENCE TO RELATED APPLICATIONS

This application claims the benefit of U.S. provisional application Ser. No. 60/237,880, entitled, "AN ALL-FIBER-OPTIC PATTERN DETECTOR" filed on Oct. 4, 2000, having the same inventor and assigned to the same assignee as this application and which is hereby incorporated by reference.

FIELD OF THE INVENTION

The invention relates to the detection of signal patterns and, in particular, to the detection of patterns in digital optical signals.

BACKGROUND OF THE INVENTION

Noise immunity and extremely high bandwidth capacity are only a few of the myriad advantages optical signal transmission enjoys over electronic transmission, particularly within waveguides, such as optical fibers and integrated optics waveguides. Consequently, optical components are rapidly displacing their electronic counterparts in communications and other systems. Yet, in spite of the many advantages accruing to optical operations, many electronic communications components have yet to be replaced by the corresponding optical components. Consequently, optical signals are typically converted to electronic signals, operated upon in some fashion, then converted back to optical signals for transmission. In long distance transmission, for example, dispersion, absorption and other effects degrade an optical signal as it travels along a fiber. Repeaters, spaced at regular intervals are employed to "clean up" or regenerate the signals. Typically, the degraded optical signal is converted to an electronic signal. Electronic components are used to regenerate the electronic signal, then the regenerated signal is converted back to the optical realm and sent along the transmission path.

Other components within digital signal transmission systems, such as digital crossconnects and add/drop multiplexers, for example, employ similar optical-electronic-optical signal conversions. Such conversions tend to limit the benefits of optical signal transmission, imposing the switching speed limitations of electronic components on optical signals. Additionally, each signal conversion, from optical to electronic and from electronic to optical, consumes power, exposes the signals to the introduction of errors, and significantly increases the cost of a system.

Many components within a communications system employ components which recognize patterns in serial optical signals. Conventional systems convert the serial optical signal to an electronic signal for pattern recognition, then convert the signal back to the optical regime for further transmission. The reduced costs, higher operating speeds, and reduced power consumption associated with all-optical operation strongly encourage the elimination of such optical-to-electronic-to-optical signal conversions and a component which recognizes optical signal patterns without optical-to-electronic-to-optical signal conversion, would therefore be highly desirable.

SUMMARY

An optical pattern detector in accordance with the principles of the present invention includes an optical sensor configured to sense a plurality of optical signals, an optical summer configured to receive and sum the sensed optical signals, and a sampler configured to sample the summed optical signals.

In one aspect of an optical pattern detector in accordance with the principles of the present invention, a serial optical pattern detector employs a plurality of optical couplers arranged in series and separated by optical delay(s) to "tap off" a sequential binary optical signal. The optical delay between optical couplers is equal to the "bit time" of the sequential binary signal whose patterns are being detected. The tapped optical signals are transmitted to an optical summer, or "optical multiplexer", through equal optical delays and synchronously detected. The detection process may be effected, for example, by a photodetector. The taps may be "weighted" to couple different signal levels to different "bit positions" within a detected signal, thereby effecting various forms of optical digital-to-analog conversion.

In another aspect of an optical pattern detector in accordance with the principles of the present invention, a parallel optical pattern detector employs a plurality of optical couplers arranged in parallel to "tap off" sequential binary optical signals from a plurality of optical waveguides such as optical fibers, arranged, for example as a high-speed optical "bus." The couplers are situated on the parallel optical waveguides so as to tap synchronized optical signals. For example, with eight optical waveguides transmitting eight serial binary signal bit streams arranged as a parallel byte stream, eight optical couplers would tap the eight waveguides at equal optical delays from the source of the byte-wide optical data stream. As in the case of the serial arrangement, the tapped optical signals are transmitted to an optical summer through equal optical delays and synchronously detected.

The detection process may be effected, for example, by a photodetector. The taps may be "weighted" to couple different signal levels to different "bit positions" within a detected signal, thereby effecting various forms of optical digital-to-analog conversion. The optical delays may be fixed or variable, as may the weighting of the tap values between the couplers and summer. The delays, couplers, and summer may be implemented using optical fiber or integrated optics technologies.

The detector may be employed as a framer for SONET, SDH, or other serial binary optical signals, for example. In another aspect of the invention, the pattern detector may be operated as an optical digital to analog converter and, through use of various weightings of the tap values, the detector may directly decode, in the optical regime, voice samples digitally encoded using any of various coding algorithms. Similarly, weightings of the tap values may be set to allow the detector to decode digital video signals in the optical regime.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
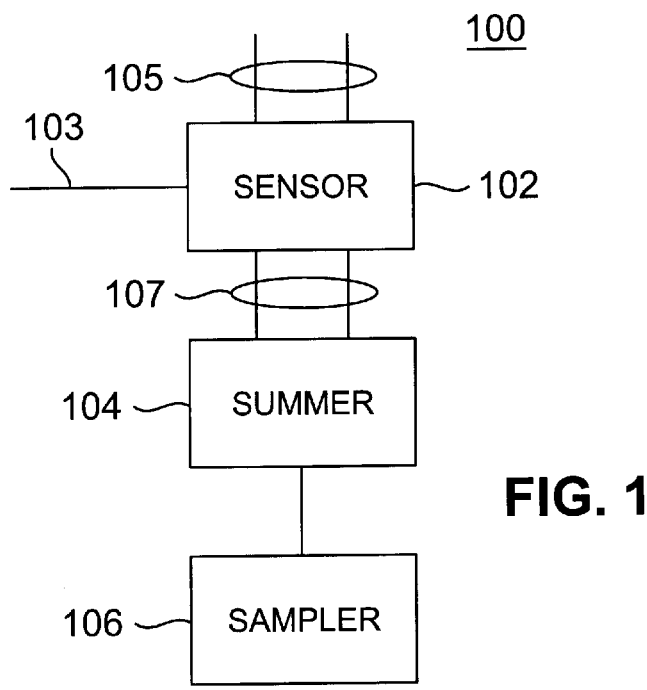
FIG. 1 is a conceptual block diagram of an optical pattern detector in accordance with the principles of the present invention.

The functional block diagram of FIG. 1 illustrates the components of an optical pattern detection system 100 in accordance with the principles of the present invention. An optical sensor 102 couples binary optical signals into an optical summer 104. The optical sensor 102 may be arranged in series or in parallel and accept optical signals of corresponding orientation. That is, a series-configured optical sensor 102 may be arranged to accept a bit-serial binary optical signals at a serial optical input 103, which may take the form of a single optical fiber or a waveguide formed in a substrate using processes, such as etching, developed for integrated circuit manufacture and integrated optics. In a parallel-configured optical sensor 102 may be arranged to accept, parallel, such as byte-wide, binary optical signals through a plurality of optical inputs 105, each of which may take the form of a single fiber or integrated optics waveguide. For convenience and clarity of description, the more detailed descriptions related to the following Figures will be described with reference to fiber implementations, but integrated optics waveguide implementations are also envisioned within the scope of the present invention.

As will be described in greater detail in the discussion related to FIG. 4, in an illustrative serial optical binary optical signal embodiment, the sensing unit 102 includes a plurality of optical couplers arranged in series and separated by optical delay(s) to "tap off" a sequential binary optical signal. The optical delay between optical couplers is equal to the "bit time" of the sequential binary signal whose patterns are being detected and the tapped optical signals are transmitted to the optical summer 104 through equal optical delays 107. In an illustrative parallel optical signal embodiment, the optical sensor 102 includes a plurality of optical couplers arranged in parallel to "tap off" sequential binary optical signals from a plurality of optical waveguides such as optical fibers, arranged, for example as a high-speed optical "bus." The couplers are situated on the parallel optical waveguides so as to tap synchronized optical signals. For example, with eight optical waveguides transmitting eight serial binary signal bit streams arranged as a parallel byte stream, eight optical couplers would tap the eight waveguides at equal optical delays from the source of the byte-wide optical data stream. As in the case of the serial arrangement, the tapped optical signals are transmitted to the optical summer 104 through equal optical delays 107 and synchronously detected.

The optical summer 104 may take the form of a star coupler, for example, in the case of an optical fiber embodiment, with the binary optical output of the optical sensor 102 coupled through equal delays 107, which may take the form of equal lengths of optical fiber. Similarly, in an integrated optics embodiment, the binary optical output of the optical sensor 102 may coupled through equal delays 107, which may take the form of equal lengths of optical waveguide etched in an integrated optics substrate in a manner which forms an integrated optics star coupler.

The output of the summer 104 is fed to an optical sampler 106. As is described in greater detail in the discussion related to FIG. 4 the optical sampler may include a photodector configured to sample the output of the summer 106 in synchrony with the data arriving at a serial 103 or parallel 105 input. That is, the sampler 106 acts as a gating function to insure that the output of the pattern detector 104 corresponds to a window of "good" optical data. In a parallel configuration, the sampler may gate, for example, a 3 dB window, during which an optical pulse on each of the lines of the parallel optical input 105 rises and falls 3 dB related to its peak power. Similarly, in the series configuration, the sampler may employ a window, such as a 3 dB window, to sample the serial input as the last bit of a serial data word rises and falls 3 dB relative to the peak power of the pulse in the last bit position. As will be described in greater detail in the discussion related to FIGS. 4 and 5, the delays 107 may be weighted to provide various optical digital to analog conversions. The optical delays may be fixed or variable, as may the weighting of the tap values between the couplers and summer. The delays, couplers, and summer may be implemented using optical fiber or integrated optics technologies.

The detector 100 may be employed as a framer for SONET, SDH, or other serial binary optical signals, for example. The pattern detector 100 may be operated as an optical digital to analog converter and, through use of various weightings of the tap values, the detector may directly decode, in the optical regime, voice samples digitally encoded using any of various coding algorithms. Similarly, weightings of the tap values may be set to allow the detector to decode digital video signals in the optical regime. Additionally, the entirety of optical signals, not just a small, coupled percentage of the signal, may be employed for optical digital to analog conversion.

Figure 2:
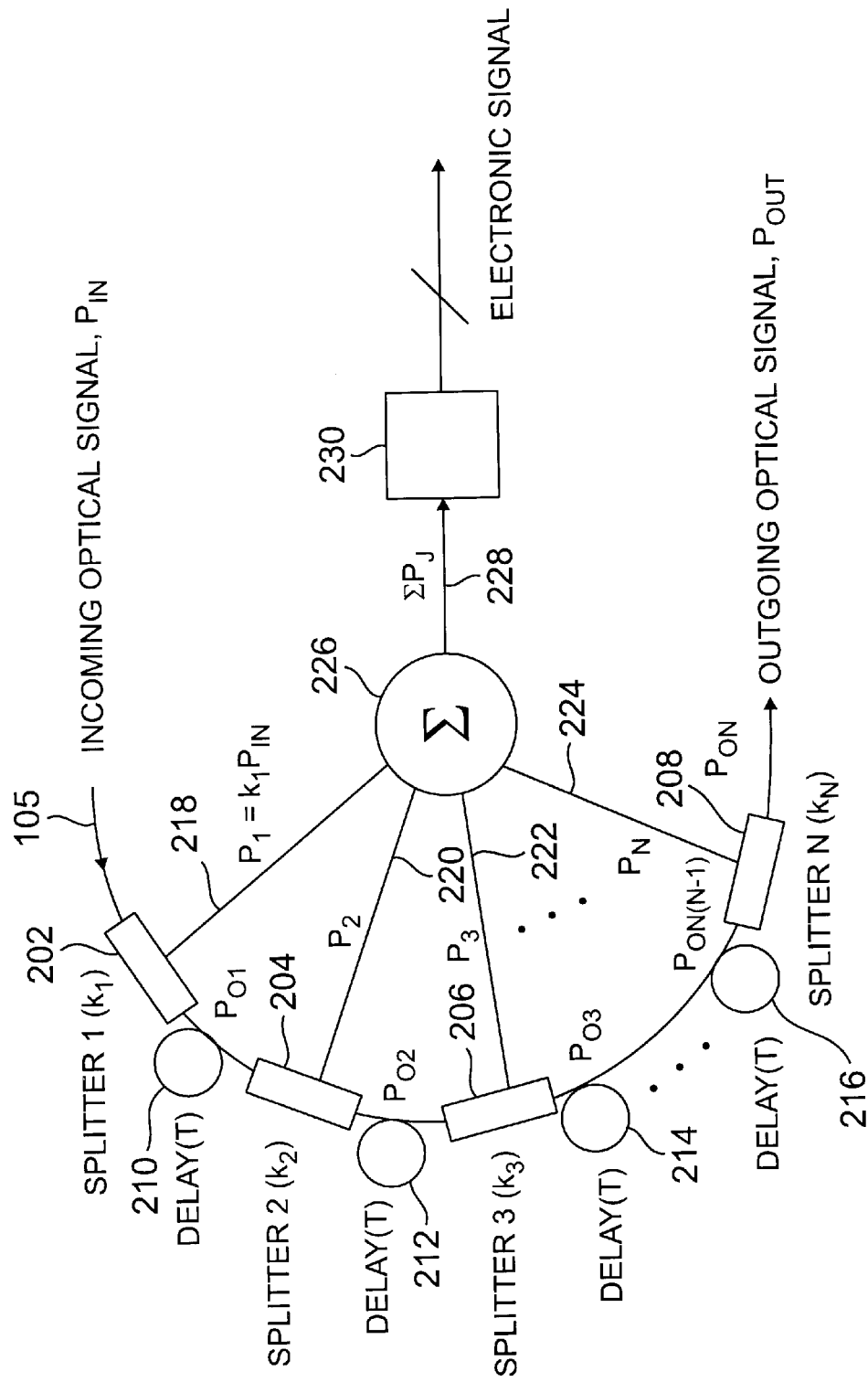
FIG. 2 is a more detailed conceptual block diagram of a serial embodiment of an optical pattern detector in accordance with the principles of the present invention.

The conceptual block diagram of FIG. 2 provides a more detailed view of a serially-configured optical pattern detector in accordance with the principles of the present invention. An incoming serial binary optical signal PIN is accepted at the serial input 103. The optical signal is coupled through N couplers, or splitters, 202, 204, and 208, through intervening delays 210, 212, 214, and 216 associated with the passthrough signals $P_{O1}$, $P_{O2}$, $P_{O3}$, $P_{O(N-1)}$, through $P_{ON}$, respectively. The split signals $P_1$, $P_2$, $P_3$, through $P_N$, are transmitted through equal-delay waveguides 218, 220, 222, through 224 to an optical summer 226 having at an output 228 the sum, $\Sigma P_j$, of the optical power transmitted through the N waveguides 218 through 224. As previously noted, the combination of equal delay optical waveguides 218, 220, 222, through 224, summer 226, and output 228 may take the form of a passive optical multiplexer, such as a star coupler or equivalent integrated optics counterpart. The number of couplers, N, is equal to the number of bits in the pattern to be detected. The sum, $\Sigma P_j$, of optical power from the couplers is transmitted to a sampler 230 which includes a photodetector, and a controller which samples the sum, $\Sigma P_j$, during a window of the pulse period T which provides for a high signal to noise ratio.

In order to properly align bits within an incoming serial optical bit stream, each of the delays 210, 212, 214, through 216 (which may take the form of short optical waveguides, such as optical fiber segments) delay a received optical signal by a the pulse period T of the received signal. That is, for a given bit rate, the period of each pulse, T, determines the delay required between each of the couplers. For example, with fiber delays (assuming an index of refraction, n=1.5), and a bit rate of 10 Gbs the period T of each pulse is T=1/(10 Gbps)=1/($10^{10}$) secs. The speed of light in the fiber is v=c/n=$3 \times 10^{10}$/1.5 cm/sec=$2 \times 10^{10}$ cm/sec, the length of each the fibers between couplers is $L_T$=vT=[$2 \times 10^{10}$ cm/sec][1/($10^{10}$) secs]=2 cm. Optical losses in delays such as this would be negligible.

Binary serial data transmitted over optical fiber is frame formatted according to a well-known standard, such as SONET/SDH, ATM, TDM, IP, Frame Relay, etc. In general, a frame consists of a header (which contains a framing pattern), additional overhead bytes or octets (for maintenance, protection, provisioning, error control, a clear channel, address, and other), the payload field that contains "client's" data, and in some cases an forward error control (FEC) field. Such standards employ "overhead" octets, such as framing patterns, protection and error control patterns, etc., that are detected at a receiving node.

Binary encoded optical information is transmitted serially at a fixed bit rate, bps, at a bit period, T. For simplicity, let us assume that the framing pattern is:

. . . 01010|11111111|00001111|000 . . .

where the delimiter "|" indicates the boundary between bytes or octets. The pattern 11111111 (all ones) defines the starting octet of the frame followed by the octet 00001111 (not all-ones), where time progresses from left to right. Notice that this pattern repeats every frame (e.g., in SONET/SDH the framing pattern repeats every 125 $\mu$secs) or every superframe (a fixed number of frames). The preceding pattern . . . 01010 may optionally. If the frame is not repetitive, then the preamp sequence ( . . . 01010) preceding the framing octet(s) is used to keep the clock at the receiver running at a stable incoming bit rate). Thus, if eight optical couplers (or splitters) were concatenated every 2 cm in line with the fiber, then a complete octet would be read out from the eight couplers. If the eight outputs of the eight couplers were summed, then one photodetector would suffice to identify the pattern.

Two relationships hold at the first coupler 202:

$$P_{O1}=P_{IN}-P_1-I \qquad 1$$

$$P_1=k_1 P_{IN} \qquad 2$$

Where $k_1$ is a dimensionless factor less than 1, typically 0.01 to 0.1, and I is the insertion loss of the coupler.

At the $J^{th}$ coupler, these two relationships are generalized as:

$$P_{OJ}=P_{O(J-1)}-P_J-I \qquad 3$$

$$P_J=k_J P_{O(J-1)} \qquad 4$$

Where J varies from 1 to N, at the input $P_0=P_{IN}$, and at the output $P_{ON}=P_{OUTPUT}$ When the output powers $P_1, P_2, \ldots,$ and $P_N$ are summed (that is, passively multiplexed by a single fiber structure indicated by $\Sigma$) then the optical power sum is produced:

$$\Sigma P_J, J=1-N \qquad 5$$

At two extreme cases, when all bits in the byte are "ones", the sum has the maximum possible value, and when all zeroes, the sum is "zero". This summed optical power is detected by a single photodetector that produces a current (or voltage) level, proportional to the optical power sum which is indicative of the number of ones in the pattern passing through the optical fiber. In this case, an all-one pattern is uniquely detected, if it repeats every superframe.

Figure 3:
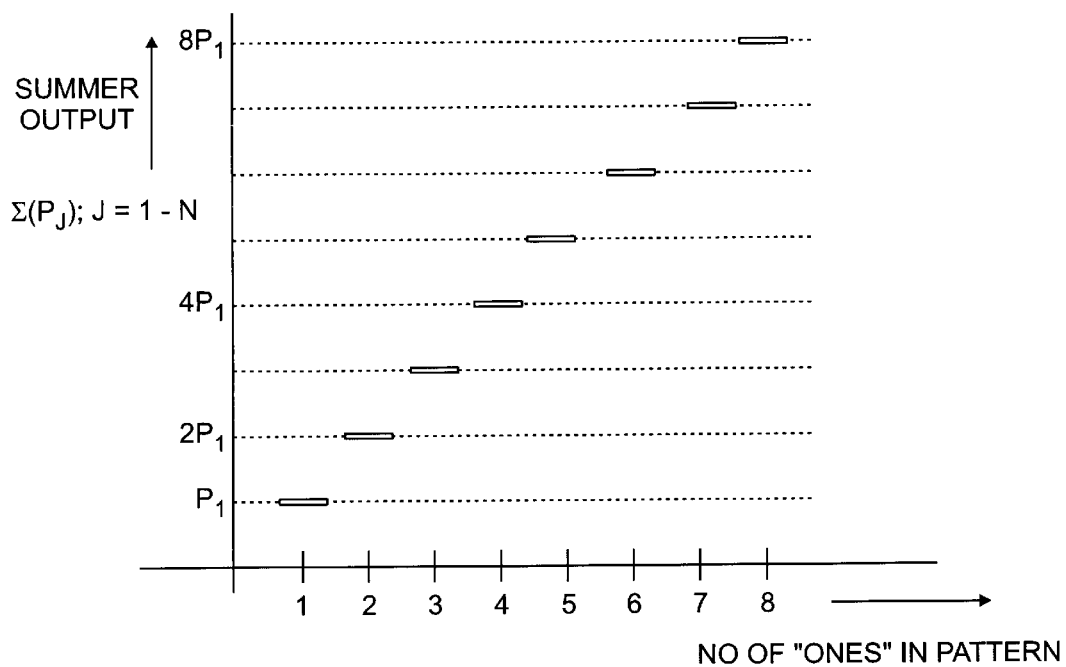
FIG. 3 is a plot of optical output power versus the number of "ones" in a binary optical signal for an even-weighted optical pattern detector in accordance with the principles of the present invention.

If coupling values for each bit position is the same, that is, if each bit position in the optical pattern detector is given the same weight, the total power to be detected is illustrated in the graph of FIG. 3 which plots output power versus number of ones, indicated by the presence of an optical pulse, in a detected word (eight bit word in the example). In this case, $$P_1=P_2= \ldots =P_N \qquad 6$$

Thus, the total power to be detected is the sum (FIG. 3):

$$\Sigma P_J=N \times P_1, J=1-N \qquad 7$$

If $P_1$=0.01 $P_{IN}$ and N=8, then for an all "one" pattern, the sum is 0.08$P_{IN}$.

However, since each coupler is characterized by IL, the fraction $k_J$ is not the same for all.

The general relationship is:

$$k_1/k_J=[P_{IN}-(J-1)I]/P_{IN}, J=1-N \qquad 8$$

Clearly, if I=0, then $k_1/k_J$=1, a result which is expected. At the Jth coupler, two relationships hold:

$P_{OJ}=P_{O(J-1)}-P_J-I$ $P_J=k_J P_{O(J-1)}$ where the input $P_{IN}=P_0$, and the output $P_{OUTPUT}=P_{ON}$.

Thus, for the case where $P_1=P_2= \ldots =P_N$, then $P_1=P_2$, or $k_1 P_{IN}=k_2 P_{O1}=k_2[P_{IN}-P_1-I]=k_2[P_{IN}-k_1 P_{IN}-I]=k_2 P_{IN}-k_1 k_2 P_{IN}-k_2 I$ The product of the two small fractions $k_1 k_2 P_{IN}$ is negligible and thus we can eliminate this term. Then, the latter is simplified to:

$k_1 P_{IN}=k_2 P_{IN}-k_2 I$ which yields the relationship:

$k_1/k_2=(P_{IN}-I)/P_{IN}$

Repeating the above, procedure for $P_1=P_3$, then $k_1 P_{IN}=k_3 P_{O2}=k_3[P_{O1}-P_2-I]=k_3[P_{IN}-2k_1 P_{IN}-2I]=k_3 P_{IN}-2k_1 k_3 P_{IN}-2k_3 I$ The product of the two small fractions $k_1 k_3 P_{IN}$ is negligible and thus we can eliminate this term. Then, the latter is simplified to:

$k_1 P_{IN}=k_3 P_{IN}-2k_3 I$ which yields the relationship:

$k_1/k_3=(P_{IN}-2I)/P_{IN}$

Similarly, we can continue with $P_1=P_4$, and so one. Finally, the general relationship is:

$k_1/k_J=[P_{IN}-(J-1)I]/P_{IN}, J=1-N$

If I is negligible, then I=0, and $k_1/k_J$=1.

Figure 4:
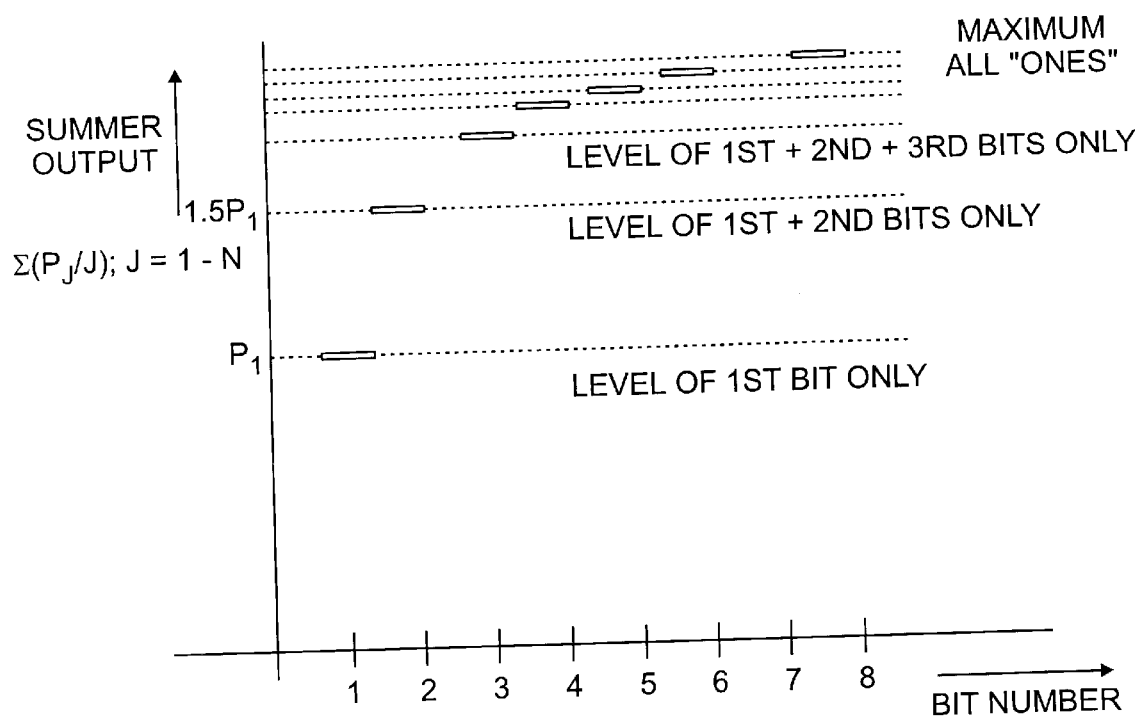
FIG. 4 is a plot of optical output power versus the number of "ones" in a binary optical signal for an uneven-weighted optical pattern detector in accordance with the principles of the present invention.

If coupling values for bit positions is the different, the total power to be detected may be as illustrated in the graph of FIG. 4 which plots output power versus number of ones in a detected eight bit word. In this illustrative embodiment, We consider the case where, $P_2=P_1/2$,
$P_3=P_1/3$,
$P_4=P_1/4$,
$P_N=P_1/N$, or, in a general form:

$$P_J=P_1/J \qquad 9$$

Then, the total power to be detected is the sum (FIG. 4):

$$\Sigma(P_1/J), J=1 \text{ to } N \qquad 10$$

If $P_1$=0.01 PIN and N=8, then for an all "one" pattern, the sum is ~0.0275$P_{IN}$.

Based on this approach, if we consider the patterns 10001101 and 11100001, then each pattern yields a different sum, as follows:

Pattern 10001101:
$P_1+0P_2+0P_3+0P_4+P_5+P_6+0P_7+P_8=P_1+0P_2+0P_3+0P_4+P_1/5+P_1/6+0P_7+P_1/8=(9.45/6)P_1$
and,
Pattern 11100001:
$P_1+P_2+P_3+0P_4+0P_5+0P_6+0P_7+P_8=P_1+P_1/2+P_1/3+0P_4+0P_1+0P_1+0P_7+P_1/8=(11.75/6)P_1$ In relation 10, weighting is accomplished by selecting the constant of each coupler. Depending on coupler implementation, this weighting may be fixed or variable. A variable weighting may be achieved, for example, by applying a voltage to the optical channel of the coupler. Polarization maintaining couplers with variable splitting ratios are known and may be obtained, for example from Fibercore, Inc, Charlton, Mass. Continuous variable optical attenuators may are available from TDK Inc, Garden City, N.J., or SANTEC, Inc. And continuous variable optical attenuators with multiplexers may be obtained from Lightwave Microsystems, In., San Jose, Calif.

In this case, relations 3, 4 and 9, repeated here for simplicity, determine the general relations at the Jth coupler:

$$P_{OJ}=P_{O(J-1)}-P_J-I \qquad 3$$

$$P_J=(k_J)P_{O(J-1)} \qquad 4$$

and $$P_J=P_{(J-1)}/J \qquad 9$$

Where J varies from 1 to N, at the input $P_0=P_{IN}$, and at the output $P_{ON}=P_{OUTPUT}$
The relationship of coupler values is determined by $$k_1/k_J=J[P_{IN}-(J-1)I]/P_{IN}, J=1-N \qquad 11$$

That is, at the Jth coupler, three relationships hold:
$P_{OJ}=P_{O(J-1)}-P_J-I$
$P_J=k_JP_{O(J-1)}$, and
$P_J=P_1/J$
where the input $P_{IN}=P_0$, and the output $P_{OUTPUT}=P_{ON}$.
Thus, in this the case:
$P_1=2P_2$, or
$k_1P_{IN}=2k_2P_{O1}=2k_2[P_{IN}-P_1-I]=2k_2[P_{IN}-k_1P_{IN}-I]=2k_2P_{IN}2k, k_2P_{IN}-2k_2I$
The product of the small fractions $k_1$ $k_2$ is considered negligible and thus we can eliminate this term. Then, the latter is simplified to:
$k_1P_{IN}=2k_2P_{IN}-2k_2I$
which yields the relationship:
$k_1/k_2=2(P_{IN}-I)/P_{IN}$
Repeating the above, procedure for $P_1=3P_3$, then
$k_1P_{IN}=3k_3P_{O2}=2k_3[P_{O1}-P_2-I]=3k_3[P_{IN}-(3/2)k_1P_{IN}-2I]$
The product of the two small fractions $k_1$ $k_3$ is considered negligible and thus we can eliminate this term. Then, the latter is simplified to:
$k_1P_{IN}=3k_3P_{IN}-6k_3I$
which yields the relationship:
$k_1/k_3=3(P_{IN}-2I)/P_{IN}$
Similarly, we can continue with $P_1=P_4$, and so one. Finally, the general relationship is:
$k_1/k_J=J[P_{IN}-(J-1)I]/P_{IN}, J=1-N$
If I is negligible, then I=0, and $k_1/k_J=J$.

Other weighting approaches may be employed for a variety of optical pattern recognition, or digital to analog conversion, applications, such as log conversion µ-law or α-law conversion. An all-optical pattern detector in accordance with the principles of the present invention may be used to identify the start of a frame. If the frame is repetitive, then equally weighted couplers may be suitable. When the framing pattern has been identified and located (according to a K out of N consecutive frames algorithm), then a timer (set to the frame period) may be used to locate the repetitive frame. If the pattern is content sensitive (e.g., 00001111 versus 11110000), then a weighting algorithm may be used. If the weighting algorithm uses a µ-law or α-law conversion, the all-optical pattern detector may operate as an all-optical decoder, thus converting the pulse coded modulated (digitally encoded) voice samples (PCM) directly into analog. In a similar manner, it may comprise an all-optical decoder converting digital encoded video samples into analog.

Figure 5:
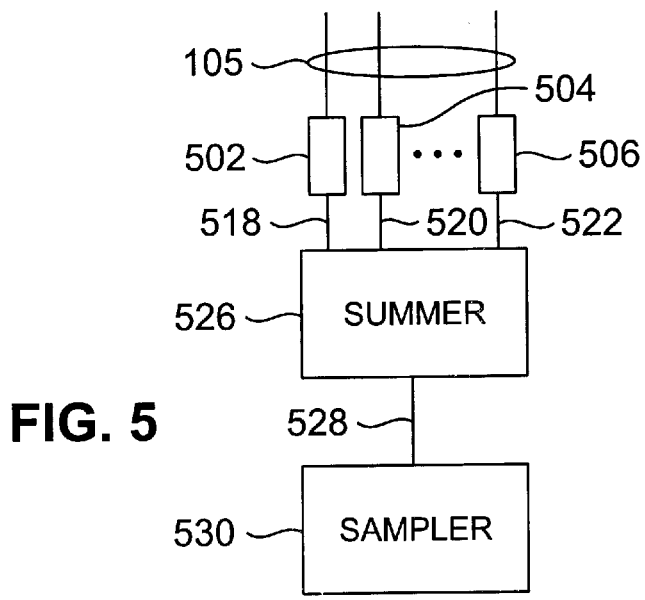
FIG. 5 is a conceptual block diagram of a parallel embodiment of an optical pattern detector in accordance with the principles of the present invention.

The conceptual block diagram of FIG. 5 illustrates a parallel embodiment of an all-optical pattern recognizer in accordance with the principles of the present invention. An incoming serial binary optical signal $P_{IN}$ is accepted at the parallel input 105. The optical signal is coupled through N couplers, or splitters, 502, 504, and 506, generating split signals $P_1$, $P_2$, through $P_N$, which are transmitted through equal-delay waveguides 518, 520, through 522, to an optical summer 526 having at an output 528 the sum, $\Sigma P_j$, of the optical power transmitted through the N waveguides 518 through 522. As previously noted, the combination of equal delay optical waveguides 518, 520 through 522, summer 526, and output 528 may take the form of a passive optical multiplexer, such as a star coupler or equivalent integrated optics counterpart. The number of couplers, N, is equal to the number of bits in the parallel pattern to be detected. The sum, $\Sigma P_j$, of optical power from the couplers is transmitted to a sampler 530 which includes a photodetector and controller which samples the sum, $\Sigma P_j$, during a window of the pulse period T which provides for a high signal to noise ratio of an optical word received at the parallel input 105. As described in the discussions related to FIGS. 2, 3, and 4, various weighting values may be assigned to the N couplers in order to produce various optical pattern recognition, or optical digital to analog conversions.

In addition to the above-mentioned benefits of all-optical operation, such as noise immunity and high speed operation, a pattern detector in accordance with the principles of the present invention does not produce the switching noise generally associated with electronic digital to analog and analog to digital converters.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An optical pattern detector comprising:
   an optical sensor configured to receive and sense a binary optical signal of at least two pulses, such that each pulse of said binary optical signal is sensed within its pulse time,
   an optical summer configured to receive and sum the sensed pulses from the optical sensor, and
   a sampler configured to sample the summed pulses, said sample indicative of an optical pattern of said received binary optical signal.

2. The optical pattern detector of claim 1 wherein the optical sensor comprises a plurality of optical couplers arranged to sense at least two pulses of a binary optical signal.

3. The optical pattern detector of claim 2 wherein the optical couplers are arranged to receive a serial binary optical signal for detection.

4. The optical patem detector of claim 2 wherein the optical couplers are arranged to receive a parallel binary optical signal for detection.

5. The optical pattern detector of claim 3 wherein the couplers are arranged in series with optical delays between each of the couplers substantially equal to the pulse time of the binary optical signal.

6. The optical pattern detector of claim 2 wherein the summer comprises a plurality of waveguides, one for each coupler, configured to guide the sensed optical signal from each of the couplers to a nexus for summation of the power from each of the sensed signals.

7. The optical pattern detector of claim 6 wherein the optical delay of each of the waveguides configured to guide the sensed optical signal from each of the couplers to a nexus for summation of the power from each of the sensed signals produces an optical delay equal to that of every other waveguide.

8. The optical pattern detector of claim 6 wherein the fraction of light coupled to each of the waveguides configured to guide the sensed optical signal from each of the couplers to a nexus for summation of the power from each of the sensed signals is equal to the fraction of light coupled to every other waveguide.

9. The optical pattern detector of claim 6 wherein the fraction of light coupled to at least one of the waveguides configured to guide the sensed optical signal from each of the couplers to a nexus for summation of the power from each of the sensed signals is unequal to the fraction of light coupled to at least one other waveguide.

10. The optical pattern detector of claim 6 wherein the fraction of light coupled to at least one of the waveguides configured to guide the sensed optical signal from each of the couplers to a nexus for summation of the power from each of the sensed signals is controllably variable.

11. The optical pattern detector of claim 6 wherein each of the plurality of waveguides configured to guide the sensed optical signal from each of the couplers to a nexus for summation of the power from each of the sensed signals comprises an optical fiber.

12. The optical pattern detector of claim 6 wherein each of the plurality of waveguides configured to guide the sensed optical signal from each of the couplers to a nexus for summation of the power from each of the sensed signals comprises an optical waveguide formed in an integrated optics component.

13. The optical pattern detector of claim 6 wherein the summer is a star coupler.

14. The optical pattern detector of claim 1 wherein the sampler comprises a photodetector, and wherein the output of said photodetector comprises a current value indicative of said optical pattern of said received binary optical signal.

15. The optical pattern detector of claim 14 wherein the sampler further comprises a controller connected to sample the output of the photodetector in synchrony with a pulse time of the binary optical signal being detected.

16. The optical pattern detector of claim 15 wherein the controller is connected to sample the output of the photodetector during a window of time corresponding to the pulse time of the last pulse of a binary optical signal word in a serial binary optical input signal configuration.

17. The optical pattern detector of claim 15 wherein the controller is connected to sample the output of the photodetector during a window of time corresponding to the pulse time of a binary optical signal word in a parallel binary optical input signal configuration.

18. The optical pattern detector of claim 15 wherein the controller is connected to sample the output of the photodetector during a window of time corresponding to the pulse time of a framing pattern.

19. The optical pattern detector of claim 9 wherein the fraction of light coupled to at the waveguides configured to guide the sensed optical signal from each of the couplers to a nexus for summation of the power from each of the sensed signals is weighted to produce an optical $\alpha$-law decoding.

20. The optical pattern detector of claim 9 wherein the fraction of light coupled to at the waveguides configured to guide the sensed optical signal from each of the couplers to a nexus for summation of the power from each of the sensed signals is weighted to produce an optical $\mu$-law decoding.

21. A method for detecting an optical pattern comprising the steps of:
(A) receiving and sensing a binary optical signal of at least two pulses such that each pulse of said binary optical signal is sensed within its pulse time,
(B) summing the pulses sensed in step A; and
(C) sampling the pulses summed in step B, said sample indicative of an optical pattern of said received binary optical signal.

22. The method of claim 21 wherein the step (A) of receiving and sensing a binary optical signal comprises the step of:
(A1) sensing the at least two optical pulses through at least two optical couplers.

23. The method of claim 22 wherein the step of sensing the at least two optical pulses comprises the step of:
(A2) sensing a serial binary optical signal.

24. The method of claim 22 wherein the step of sensing the at least two optical pulses comprises the step of:
(A3) sensing a parallel binary optical signal.

25. The method of claim 23 wherein the step (A2) of sensing a serial binary optical signal comprises the step of:
(A4) sensing the pulses through couplers arranged in series with optical delays between each of the couplers substantially equal to the pulse time of the binary optical signal.

* * * * *